US009298930B2

(12) United States Patent
Gammon

(10) Patent No.: US 9,298,930 B2
(45) Date of Patent: Mar. 29, 2016

(54) GENERATING A DATA AUDIT TRAIL FOR CROSS PERIMETER DATA TRANSFER

(71) Applicant: Research In Motion Limited, Waterloo (CA)

(72) Inventor: Scott Peter Gammon, Waterloo (CA)

(73) Assignee: BlackBerry Limited, Waterloo (CA)

( * ) Notice: Subject to any disclaimer, the term of this patent is extended or adjusted under 35 U.S.C. 154(b) by 150 days.

(21) Appl. No.: 13/858,231

(22) Filed: Apr. 8, 2013

(65) Prior Publication Data
US 2014/0304830 A1 Oct. 9, 2014

(51) Int. Cl.
*G06F 21/50* (2013.01)
*G06F 21/60* (2013.01)
*G06F 21/62* (2013.01)

(52) U.S. Cl.
CPC ............ *G06F 21/60* (2013.01); *G06F 21/6218* (2013.01); *G06F 2221/2101* (2013.01)

(58) Field of Classification Search
CPC ............ G06F 11/0709; G06F 11/3006; G06F 11/327; G06F 11/3495; G06F 2221/2129; G06F 21/6218; G04L 41/069; H04L 41/028; H04L 43/10
USPC ................................. 726/27; 714/48, E11.24
See application file for complete search history.

(56) References Cited

U.S. PATENT DOCUMENTS

| 8,929,287 | B1 * | 1/2015 | Huang et al. ............... 370/328 |
| 2007/0180449 | A1 * | 8/2007 | Croft et al. ................. 718/1 |
| 2008/0256536 | A1 * | 10/2008 | Zhao et al. ................. 718/1 |
| 2009/0049510 | A1 * | 2/2009 | Zhang et al. ............... 726/1 |
| 2010/0011358 | A1 * | 1/2010 | Kettler et al. .............. 718/1 |
| 2010/0031348 | A1 * | 2/2010 | Lam et al. .................. 726/19 |
| 2011/0029809 | A1 * | 2/2011 | Dhuse et al. ............... 714/6 |
| 2012/0005542 | A1 | 1/2012 | Petersen et al. |
| 2012/0023494 | A1 * | 1/2012 | Harrison et al. ............ 718/1 |
| 2014/0228130 | A1 * | 8/2014 | Moran ....................... 463/43 |
| 2014/0229221 | A1 * | 8/2014 | Shih et al. ................. 705/7.23 |

FOREIGN PATENT DOCUMENTS

| WO | 2005086000 A2 | 9/2005 |
| WO | 2011049574 A1 | 4/2011 |

OTHER PUBLICATIONS

Windows Data Protection; Oct. 2001; Microsoft MSDN Article No. 995355 URL: http://msdn.microsoft.com/en-us/library/ms995355.aspx (accessed Mar. 6, 2013).
Document audit trail; IBM FileNet P8, Version 5.1.+; Last updated Oct. 2011 URL: http://pic.dhe.ibm.com/infocenter/p8docs/v5r1m0/topic/com.ibm.p8.sysoverview.doc/p8sov103.htm (accessed Mar. 6, 2013).
Unpublished U.S. Appl. No. 13/293,743, filed Nov. 10, 2011.

(Continued)

*Primary Examiner* — Kambiz Zand
*Assistant Examiner* — Tongoc Tran
(74) *Attorney, Agent, or Firm* — Ridout & Maybee LLP

(57) ABSTRACT

A computing device is disclosed having two or more perimeters, where each perimeter is a logical separation of computing resources. A computing device and method are also disclosed for generating a data audit trail for data transfers between two perimeters.

21 Claims, 5 Drawing Sheets

(56) References Cited

OTHER PUBLICATIONS

Ken Barr, et al. "The VMware Mobile Virtualization Platform: is that a hypervisor in your pocket?", ACM SIGOPS Operating Systems Review, vol. 44. No. 4, Dec. 13, 2010, p. 124, XP055078451, ISSN: 0613-5980, D0l: 10.1145/1899928.1899945, the whole document.
Extended European search report issued for corresponding EP Application No. 13162659.0 dated Sep. 20, 2013.

* cited by examiner

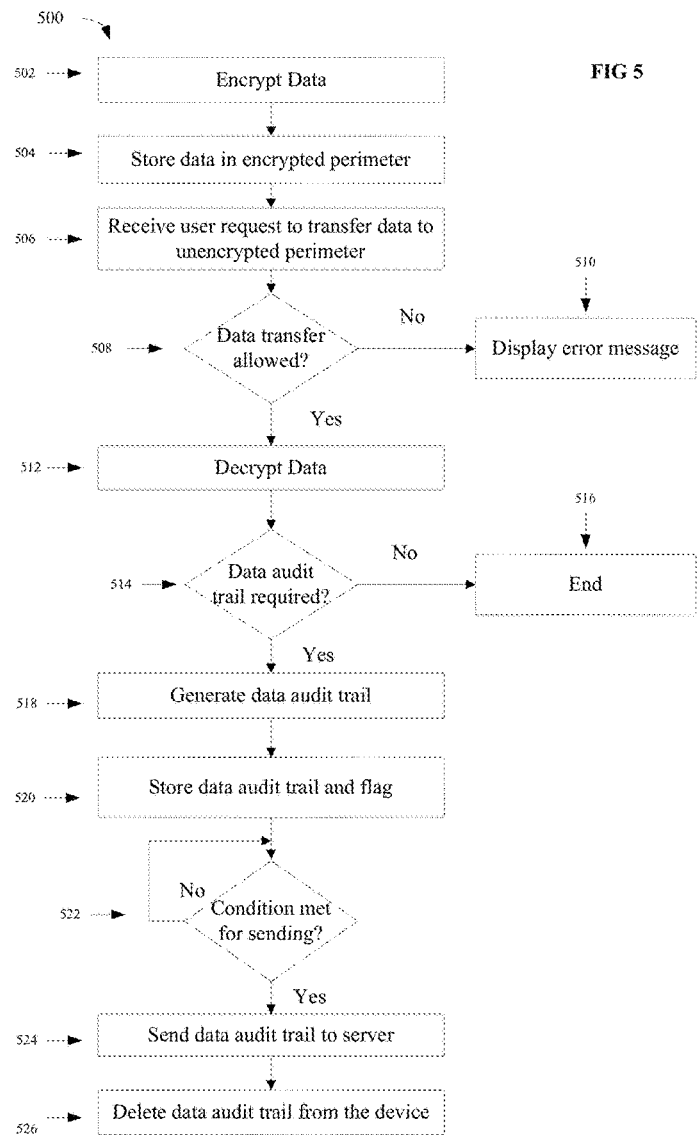

GENERATING A DATA AUDIT TRAIL FOR CROSS PERIMETER DATA TRANSFER

TECHNICAL FIELD

This disclosure relates to generating an audit trail, particularly for cross-perimeter data transfers performed on a computing device having at least two perimeters.

BACKGROUND

In many instances, computing devices may include data, application, and/or network resources whose accessibility is controlled by security protocols. For example, resources such as user accounts, administration rights, password protection, database management, and others may be managed by or otherwise associated with different entities (e.g., an enterprise, a user).

BRIEF DESCRIPTION OF THE DRAWINGS

Embodiments of the present disclosure will now be described, by way of example only, with reference to the attached Figures, wherein:

FIG. 5 is a flowchart illustrating an example method for generating a data audit trail for cross perimeter data transfer.

DETAILED DESCRIPTION OF EXAMPLE EMBODIMENTS

Figure 1:
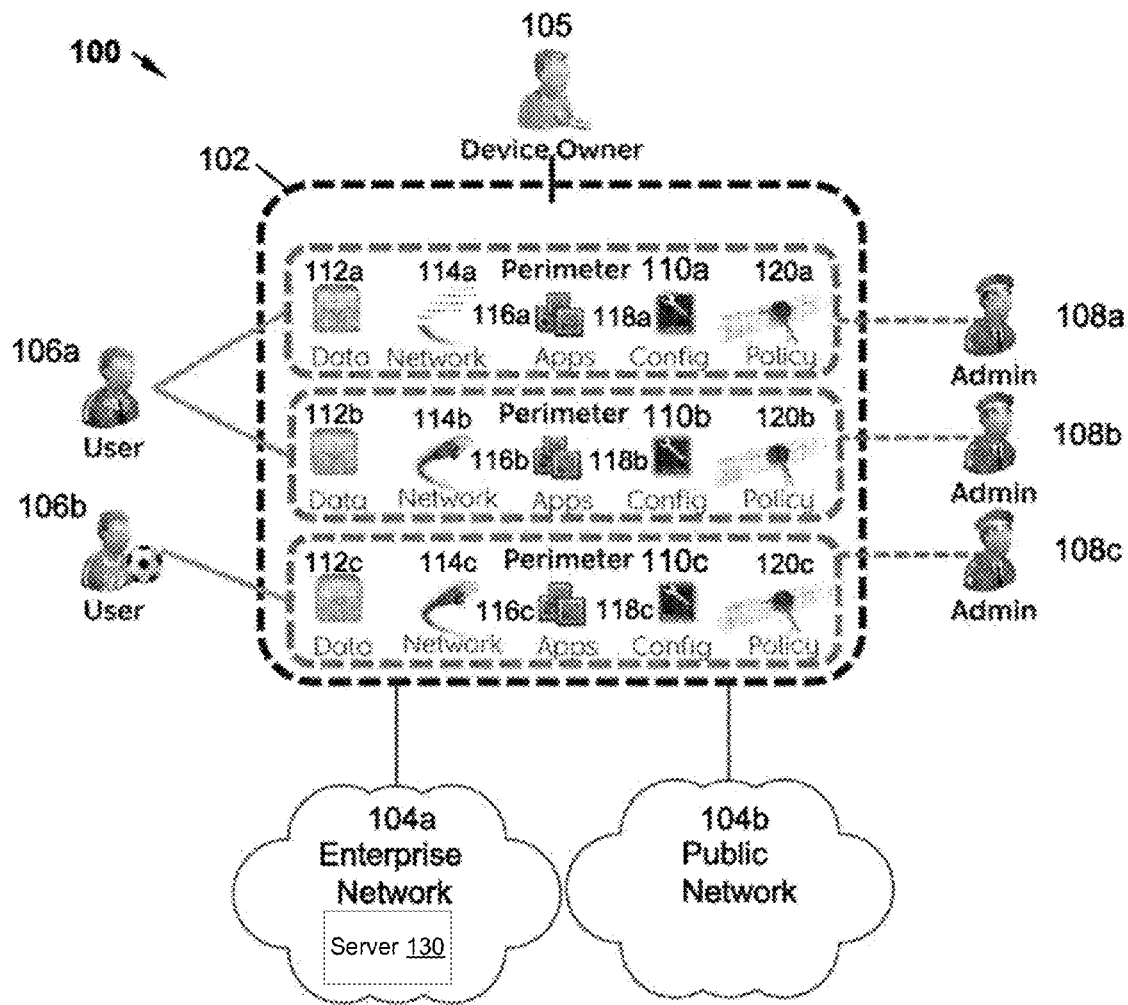
FIG. 1 illustrates an example system suitable for generating a data audit trail for cross perimeter data transfer.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. A person skilled in the art would understand that variations and modifications, both those currently known and those that may be later developed, are possible within the scope of the disclosure. Also, the description is not to be considered as limiting the scope of the embodiments described herein.

In some implementations, a single user device may include multiple perimeters that logically separate computer resources (e.g., applications, data, network access, configuration files) such that a perimeter may be prevented from accessing resources included in a different perimeter. For example, the perimeters prevent personal resources in one perimeter from accessing corporate resources in another perimeter or vice-versa. Keeping corporate data, applications and networks isolated from personal data, applications and networks is desirable because a user can use a single device to separately access the different groups of resources. An enterprise may extend a secured, encrypted perimeter on a single user device without interfering with the user's personal experience on the same device. However, at times, it is advantageous to allow cross perimeter data transfer as requested by the user, for example, to enable the user to copy text from a first perimeter to the second. This disclosure is directed towards generating a data audit trail for cross perimeter data transfer, particularly from an encrypted perimeter to an unencrypted perimeter. The data audit trail is sent to a server for potential analysis and will include information associated with the data transferred to enable auditing for malicious activity, such as leaks of confidential material.

In one aspect of this disclosure, a computing device having a first perimeter and a second perimeter is disclosed. The processor of computing device receives a request from a user to transfer data from the first perimeter to the second perimeter and generates a data audit trail, the data audit trail having information associated with the data. The information associated with the data includes at least one of an identifier associated with the data transfer, a timestamp of the data transfer and a user ID associated with the user.

In another aspect of this disclosure, the first perimeter is an encrypted perimeter and the second perimeter is an unencrypted perimeter. The processor of the computing device encrypts data for storage in the encrypted perimeter and decrypts the data in response to receiving the user request. The data includes any of a text string stored in a file, an image stored in a file and a file.

In another aspect of this disclosure, the text string is stored in a file and the text sting is decrypted only when the text string has fewer characters than a pre-determined number.

In another aspect of this disclosure, the image is stored in a file and when the image has a resolution larger than a pre-determined resolution, the image is resized to the pre-determined resolution prior to decrypting the image.

In another aspect of this disclosure, the data audit trail is stored in the encrypted perimeter until a pre-determined condition is reached. A flag may also be stored indicating that the data audit trail is stored for sending. The data audit trail is then sent to a server after the pre-determined condition is reached, for example when an encrypted communication session is established with the server. The pre-determined condition may be one of a pre-determined time for sending the data audit trail or a pre-determined network condition for sending the data audit trail. The data audit trail and the flag are then deleted after sending the data audit trail.

Figure 4:
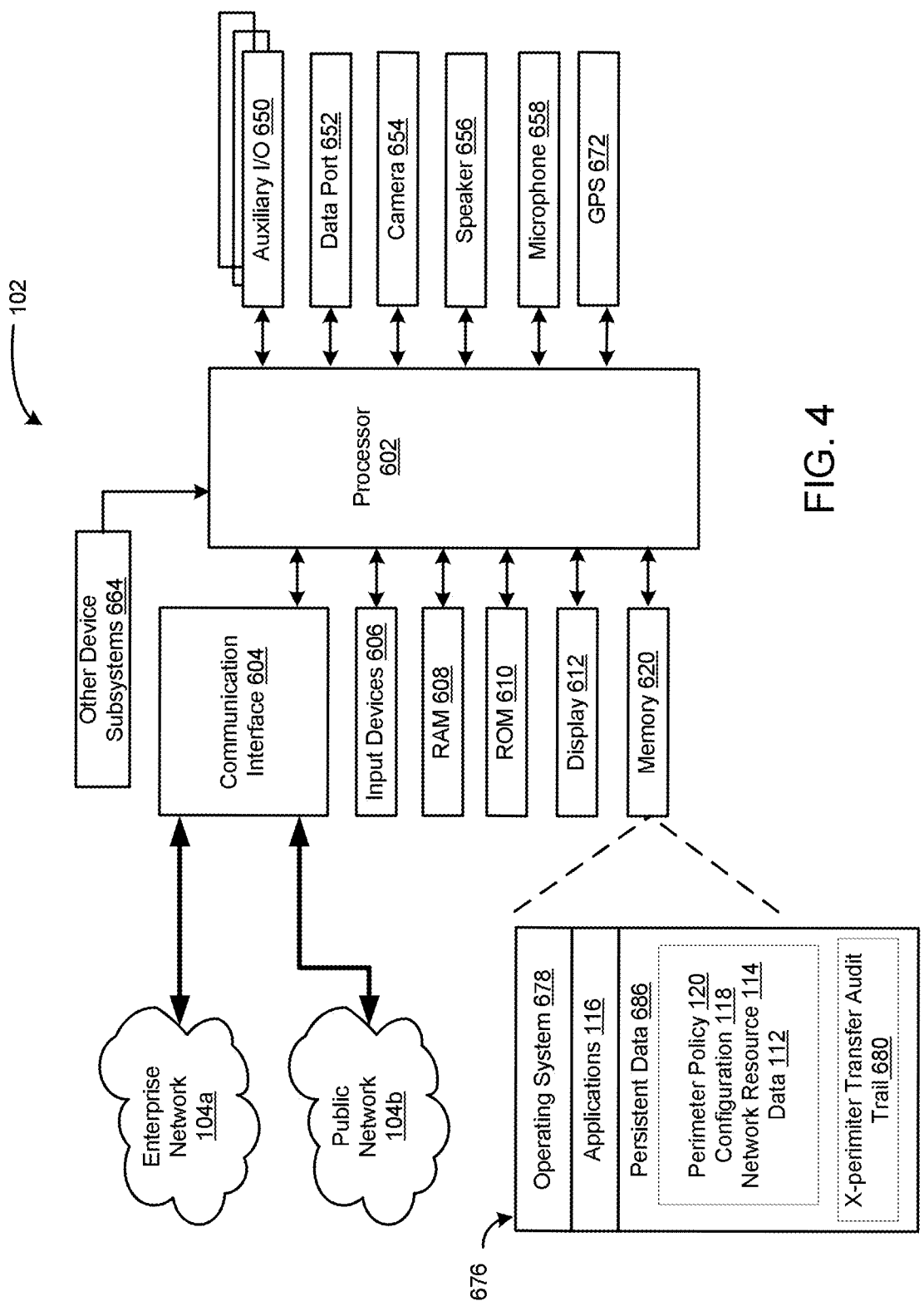
FIG. 4 is a block diagram illustrating a mobile communication device suitable for generating a data audit trail.

Reference is made to FIG. 4 which illustrates a computing device 102 suitable for generating a cross-perimeter data audit trail in accordance with example embodiments of the present disclosure and for operating as a device under test. Examples of the computing device 102 include, but are not limited to, a mobile phone, smartphone or superphone, tablet computer, desktop computer, notebook computer (also known as a laptop, netbook or ultrabook computer depending on the device capabilities), wireless organizer, personal digital assistant (PDA), electronic gaming device, and special purpose digital camera.

The computing device 102 includes a rigid case (not shown) housing the electronic components of the computing device 102. The electronic components of the computing device 102 are mounted on a printed circuit board (not shown). The computing device 102 includes a processor 602 which controls the overall operation of the computing device 102.

Communication functions, including data and voice communication, are performed through a communication interface 604. The device 102 may be connected to multiple networks via communication interface 604, such as the enterprise network 104a and the public network 104b. The enterprise network 104a is a network associated with an enterprise. The enterprise may comprise a corporate or business entity, a government body, a non-profit institution, or any other organization connected to the device 102. The enterprise may be the owner 105 or manager of device 102. In the illustrated embodiment, the networks 104 facilitate wireless and/or wireline communication with the device 102, over a variety of networks including local area networks (LANs), wireless local area networks (WLAN) and cellular networks such as Enhanced Data Rates for GSM Evolution (EDGE), Universal Mobile Telecommunications System (UMTS) and Long Term Evolution (LTE). The networks 104 may communicate using, for example, Internet Protocol (IP) packets, Frame Relay frames, Asynchronous Transfer Mode (ATM) cells, voice, video, data, and other suitable information between network addresses. In addition, the enterprise network 104a and the public network 104b may comprise a single network or a plurality of networks. The enterprise network 104a and the public network 104b are any suitable network that configured to communicate with the device 102.

The processor 602 interacts with other components, such as one or more input devices 606, RAM 608, ROM 610, a display 612, persistent (non-volatile) memory 620 which may be flash memory or any other suitable form of memory, auxiliary I/O subsystems 650, data port 652 such as serial data port (e.g., Universal Serial Bus (USB) data port), camera 654 such as video and/or still camera, speaker 656, microphone 658, a global positioning system (GPS) device 672 which enables the processor 602 to determine GPS coordinates (i.e., location) of the computing device 102 at any appropriate time, and other device subsystems generally designated as 664. The components of the computing device 102 are coupled via a communications bus (not shown) which provides a communication path between the various components.

The display 612 may be provided as part of a touchscreen which provides an input device 606. The display 612 which together with a touch-sensitive overlay (not shown) operably coupled to an electronic controller (not shown) comprise the touchscreen. User-interaction with the GUI is performed through the input devices 606. Information, such as text, characters, symbols, images, icons, and other items are rendered and displayed on the display 612 via the processor 602.

The input devices 606 may include a keyboard, control buttons (not shown) such as a power toggle (on/off) button, volume buttons, camera buttons, general purpose or context specific buttons, 'back' or 'home' buttons, phone function buttons, and/or a navigation device. When the display 612 is provided as part of a touchscreen, the various buttons or controls may be provided by onscreen user interface elements displayed on the display 612 instead of, or in addition to, physical interface components. The keyboard may be provided instead of, or in addition to, a touchscreen depending on the embodiment. At least some of the control buttons may be multi-purpose buttons rather than special purpose or dedicated buttons.

The processor 602 operates under stored program control and executes software modules 676 stored in memory, for example, in the persistent memory 620. The persistent memory 620 also stores data 686 such as user data, user information and information regarding the components and technical capabilities of the computing device 102. Additionally, persistent memory 620 stores policy 120. As illustrated in FIG. 6, the software modules 676 comprise operating system software 678 and software applications 116. The software modules 676 or parts thereof may be temporarily loaded into volatile memory such as the RAM 608. The RAM 608 is used for storing runtime data variables and other types of data or information. Although specific functions are described for various types of memory, this is merely one example, and a different assignment of functions to types of memory could also be used.

Turning to an example environment, FIG. 1 illustrates an example system 100 having a computing device 102 with multiple perimeters, in accordance with one or more embodiments of the present disclosure. For example, the system 100 may enable perimeter administration such that a policy for a perimeter may identify resources that need to be audited when accessed by specific resources external to the perimeter. A perimeter may generally refer to a logical separation of computing resources such that transferring data between perimeters and accessing other perimeter resources is audited and/or restricted.

The system 100 includes a computing device 102 communicably coupled to networks 104a and 104b (individually and collectively referred to as 104) via communication interface 604. In addition, the computing device 102 may interact with a device owner 105, users 106a and 106b, each having a unique user ID (individually and collectively referred to as 106), administrators 108a, 108b, 108c (individually and collectively referred to as 108), a combination of the foregoing, or others. The device 102 includes multiple perimeters 110a, 100b, 110c (individually and collectively referred to as 110). Each perimeter 110 includes data 112, network access resource 114 for providing access to networks via communication interface 604, one or more applications 116 for providing services to users 106, configurations 118 for configuring resources, and one or more policies 120.

The device 102 is configured with perimeters 110 that each have associated resources including, for example, data 112, network access resource 114, applications 116, configurations 118, and one or more policies 120. While the perimeters 110 are each illustrated as including all of the resources 112, 114, 116 and 118, a perimeter 110 may include only a subset of the illustrated resources, or additional resources, without departing from the scope of the disclosure. For example, a perimeter 110 may not include network access resource 114.

In the illustrated implementation, the device 102 includes the perimeters 110a-c configured to prevent access to one or more resources assigned to the perimeter. For example, the perimeter 110 may include password protection, encryption, and other processes for controlling access to resources assigned to the perimeter. A perimeter 110 may be generated by the device owner 105, a user 106, an administrator 108, or others. In some examples, the perimeter 110a may be an unencrypted perimeter, created by default for the user 106a for personal use and managed by the user 106a. In some examples, the perimeter 110a may alternatively be an encrypted perimeter created by an administrator 108a for an enterprise for corporate use and may be managed by a remote management server. In addition, a given perimeter 110 may be accessed by the device owner 105, a user 106, an administrator 108, a combination of the foregoing, or others. In some implementations, each perimeter 110 may be associated with a single user 106, and at least some users 106 may access multiple device perimeters 110. For example, the user 106a may access resources within both the perimeter 110a and the perimeter 110b, and the user 106b may have access to resources within only one perimeter 110c. The device owner 105 may have the ability to remove individual perimeters 110 from the device 102. In some implementations, the user 106 may create a perimeter 110 through an enrollment process. As part of the enrollment process, the organization associated with the enterprise network 104a may transmit information identifying the initial resources for the perimeter 110 to the device 102, via communication interface 604, including applications, configuration and policies. The perimeter administrator 108a-c may assign policies 120 for the perimeters 110 and initiate perimeter updates. In some implementations, the perimeter administrators 108 may remotely lock and/or wipe the perimeters 110.

In the illustrated implementation, a given perimeter 110 includes data 112, network access resource 114, applications 116, configurations 118, a policy 120, a combination of the foregoing, or other resources. The data 112 may be stored in memory 620. The data 112 may include various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the device 102 and its applications 116. The data 112 may also include any other appropriate data, such as data associated with VPN applications, firmware logs and policies, firewall policies, a security or access log, print or other reporting files, as well as others. The data 112 may also include the data audit trail.

The network access resource 114 includes any parameters, variables, policies, algorithms, instructions, settings, or rules for granting access to the network 104a or 104b or other network via communication interface 604. For example, the network access resource 114 may include or identify firewall policies for accessing the enterprise network 104a. In some implementations, the network access resource 114 include or otherwise identify one or more of the following: a username; a password; a security token; a Virtual Private Network (VPN) configuration; firewall policies; a communication protocol; encryption key certificate; or others.

The applications 116 may comprise any application, program, module, process, or other software that may execute, change, delete, generate, or otherwise manage information according to the present disclosure. Further, while illustrated as internal to the device 102, one or more processes associated with the application 116 may be stored, referenced, or executed remotely. For example, a portion of the application 116 may be an interface to a web service that is remotely executed. Moreover, the application 116 may be a child or sub-module of another software module or enterprise application (not illustrated). In some implementations, the application 116 may be a hosted solution that allows multiple parties in different portions of the process to perform the respective processing. For example, the enterprise network 102 may access the application 116 on the device 102 or even as a hosted application located over network 104b. In another example, portions of the application 116 may be used by the user 106 working directly at the device 102, as well as remotely via enterprise network 104a.

The configuration files 118 include any parameters, variables, policies, algorithms, instructions, settings, or rules for configuring software of the device 102. For example, the configuration files 118 may include a table that identifies settings for one or more applications 116. In some implementations, the configuration file 118 identifies initial settings for one or more applications 116. In addition to user applications 116, the configuration file 118 may identify settings for other types of applications such as operating system settings. The files 118 may, for example, be written in ASCII and line-oriented, with lines terminated by a newline or carriage return/line feed pair, depending on the operating system.

The policy 120 includes any parameters, variables, policies, algorithms, instructions, settings, or rules for controlling, limiting, monitoring, or enabling operation of a particular feature or features of the device 102. In some implementations, the policy 120 will include one or more sub-policies. Each sub-policy includes any parameters, variables, policies, algorithms, instructions, settings, or rules for controlling, limiting, monitoring, or enabling operation of a particular feature of the device 102. One or more sub-policy may operate in collaboration with one another and in some implementations the sub-policies will include conflict resolution parameters, variables, policies, algorithms, instructions, settings, or rules.

In some implementations, policy 120 includes a cross-perimeter policy or sub-policy (hereinafter referred to as the cross-perimeter policy) for allowing cross perimeter access and enforcing the generation of a cross perimeter data transfer audit trail. For example, the cross-perimeter policy for perimeter 110a may identify one or more resources external to the perimeter 110a and accessible by a process executed internal to the perimeter 110a. In some implementations, the cross-perimeter policy associated with a perimeter 110 may include or otherwise identify one or more of the following: a specific resource; an internal resource; a portion of a resource; a user; an owner; an administrator; an action type; a time period; or other information. In regards to external resources, the cross-perimeter policy may identify a specific resource external to the associated perimeter 110 that can access internal resources. When the internal resources of a perimeter are accessed from another perimeter, an audit trail may be required. The cross-perimeter policy of the respective perimeters will collectively define the conditions requiring a data-audit trail to be generated, such as for some cross perimeter data transfers. A cross perimeter data transfer may include one or more of the following: data file transfer; copying, cutting, or pasting data; accessing specific network or type of network; or other types of actions.

In some implementations, the cross-perimeter policy may identify specific resources within a perimeter 110 that external resource may access. For example, the cross-perimeter policies associated with perimeters 110a and 110b may identify that a specific trusted application in the applications 116b associated with perimeter 110b may access the data 112a or the network access resource 114a. In some implementations, the cross-perimeter policy defines access to both the external resources (in another perimeter 110) that must be audited when accessed by internal applications 116 (running in the perimeter 110) and for internal resources that must be audited when accessed by external applications 116. The cross-perimeter policy may be scoped to internal or external applications. In some implementations, cross-perimeter policy is applied to data (e.g., file system locations, networks access 114, applications 116). The cross-perimeter policy allows a controlled means for perimeter administrators 108 to audit secure perimeter assets (data 112, network access resource 114 and applications 116). In some implementations, cross-perimeter policy defines which applications 116 may communicate across perimeters 110.

In some implementations, the device 102 includes a policy 120 or sub-policy (hereinafter referred to as the authentication policy) that defines or otherwise identifies a process for user authentication prior to enabling cross perimeter data transfers. For example, the authentication policy may identify the type and content of user authentication (e.g., password strength, lifecycle) to apply to a cross-perimeter request. The user identification can further be used when generating data audits. When the user 106 requests data transfer across to multiple perimeters 110, the request may be evaluated by both an authentication policy internal to the perimeter and an authentication policy external to the perimeter. If both the policies grant access, then the resource may execute the cross-perimeter data transfer. Otherwise, the more restrictive authentication policy may determine whether the resource is granted cross perimeter data transfer. In terms of network resource accessibility, the authentication policy may identify or include information to determine which network accesses can be used by an external resource such as an application 116 executed in a different perimeter 110.

In some aspects of operation, a user 106 may access the application 116a in perimeter 110a and submit a request to transfer data 112c in perimeter 110c to application 116a in perimeter 110a. In response to at least the request, the device 102 may identify the authentication policy assigned to the perimeter 110a and determine whether the authentication policy assigned to the perimeter 110a grants the application 116a access to the data 112c. The cross-perimeter policy assigned to the perimeter 110a and the cross-perimeter policy assigned to the perimeter 110c both determine if a data audit trail must be generated. In addition, the device 102 may also identify the authentication policy assigned to the perimeter 110c to determine whether the authentication policy assigned to the perimeter 110c denies the application 116a access to the data 112c. If both allow access to the data 112c, the application 116a may transfer a portion of the data 112c to the perimeter 110a. A data audit trail is then generated if required by either of the cross-perimeter policy assigned to the perimeter 110a or the cross-perimeter policy assigned to the perimeter 110c. Otherwise, the application 116a may be denied access or the device 102 may implement the more restrictive authentication policy in the event of a conflict.

Figure 2:
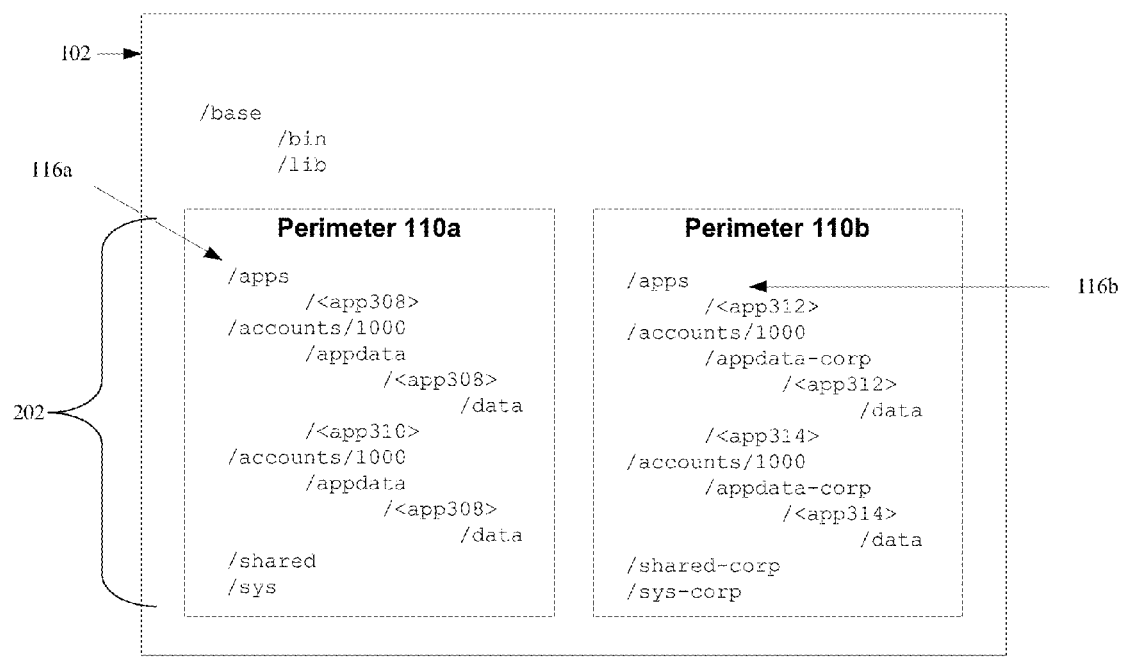
FIG. 2 is a block diagram of a device including an example perimeter file system resources for generating a data audit trail for cross perimeter data transfer.

FIG. 2 illustrates the example device 102 including a perimeter file system resource 202 according to some implementations of the present disclosure. In these implementations, the device 102 includes a logical grouping by perimeter defined by perimeter policies such as an unencrypted personal perimeter 110a and an encrypted corporate perimeter 110b. The perimeter file system resources 202 may leverage a QNX™ encryption domain constructed to secure assets. The QNX™ is a commercial Unix-like real-time operating system for embedded systems. The perimeter file system resources 202 may allow administrator to indicate that assets may be stored unencrypted. For example, if a resource is designated to be part of a personal perimeter, the perimeter file system resources 202 may indicate the resource is unencrypted. However, when a resource is designated to be part of a corporate perimeter, the perimeter file system resources 202 may indicate the resource is encrypted.

In some implementations, the perimeter file system resources 202 may enable logical grouping of the file system resources such that the overarching application and account structure designed for the device 102 can be effectively partitioned by perimeters, such as the unencrypted personal perimeter 110a and the encrypted corporate perimeter 110b. As illustrated, the grouped perimeters 110a and 110b may indicate information in the fields of application, application perimeter, user, target, target perimeter and permissions. As such, accessibility can be defined for each perimeter by describing the application to which the policy applies.

In some implementations, the application field 116a may include values 308 and 310 that indicate the unencrypted personal perimeter 110a applies to all applications (i.e. for all authors, identifications, versions). Application-ID values 308 and 310 may indicate that the unencrypted personal perimeter 110a applies to all versions of the specified application, the unencrypted personal perimeter 110a applies to any application published by the specified author, the unencrypted personal perimeter 110a applies to a specific version of the application, or others. Similarly, the application field 116b may include values 312 and 314 that indicate the encrypted corporate perimeter 110b applies to all applications (i.e. for all authors, identifications or versions), the encrypted corporate perimeter 110b applies to all versions of the specified application, the encrypted corporate perimeter 110b applies to any application published by the specified author, the encrypted corporate perimeter 110b applies to a specific version of the application, or others.

In some implementations, the device 102 may have an Application-Perimeter field describing whether a policy 120 or sub-policy applies to applications within the perimeter (being local) or outside the perimeter (being external). For example, a user field may enable description of whether the cross-perimeter policy and the authentication policy apply to a specific user or all device users. A target field may enable definition of a file system path which can be used to specify which areas of the perimeter file system the policy applies to. The target field may not be required as the only area open for sharing has already been defined so that the target field may be useful when more open areas become available.

In some implementations, the device 102 may further include a policy 120 or sub-policy for encrypting a perimeter (hereinafter referred to as the encryption policy), which may include fields such as the file system path, encryption, etc. The field for file system path may contain values that describe the area of the file system to which the policy applies. The values in the encryption field may describe whether the file system contents should be encrypted or unencrypted. A corporate perimeter 110b, for example would include values indicating that the contents of the perimeter 110b should be encrypted.

Figure 3:
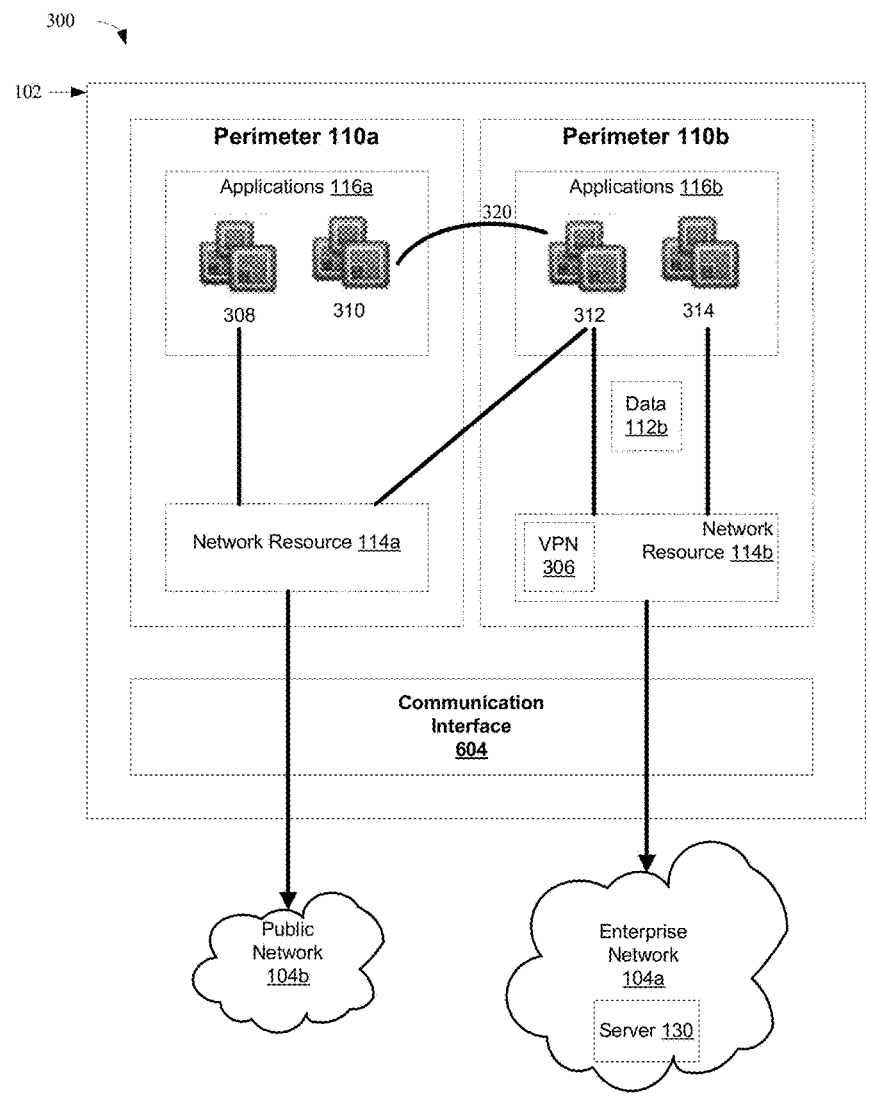
FIG. 3 is a schematic diagram of an example system illustrating access and communication across perimeters for using in a first perimeter network resources associated with a second perimeter according to various embodiments of the present disclosure.

FIG. 3 is a schematic diagram of an example system 300 illustrating access and communication across perimeters for using in a first perimeter 110b network resources 114a associated with a second perimeter 110a according to various embodiments of the present disclosure. In the illustrated implementation, the device 102 is configured to communicate with enterprise network 104a and public network 104b. The device 102 includes the personal perimeter 110a and the corporate perimeter 110b. The perimeter 110a includes applications 116a, including application 308 and application 310, and the perimeter 110b includes applications 116b, including application 312 and application 314. The perimeter 110b also includes a network access resource 114b and a virtual private network (VPN) 306 that securely connects the applications 116b with the enterprise network 104a.

The schematic 300 illustrates cross-perimeter access by a first perimeter to allow an application to use a network connection established by a second perimeter. The perimeter file system resource 202 may define an association between a connection and the underlying network(s) the perimeter exposes. The perimeter file system resource 202 may also define an association between a virtual private network 306 and the underlying network(s) the perimeter exposes. The virtual private network 306 and connection configuration may be stored inside a perimeter along with one or more policy or sub-policy that govern the network and configuration usage.

The perimeter 110a and the perimeter 110b may include the network access resource 114a and the network access resource 114b, respectively. In this embodiment, the perimeter 110a and the perimeter 110b allow for cross-perimeter data transfers. The application 314 in the perimeter 110b connects to the enterprise network 104a through the network access resource 114b. In some implementations, the application 312 in the perimeter 110b crosses perimeters to access a resource such as the network access resource 114a in the perimeter 110a, for example to connect to public network 104b, such as the internet. For example, the application 312 may be a corporate application (e.g., a document sharing application) that access public network 104b using the network access resources 114a of the personal perimeter 110a. On the other hand, the application 308 in the perimeter 110a connects to public network 104b through the network access resource 114a in the perimeter 110a. All the aforementioned network connections 114 may be physically connected through the communication interface 604.

In some implementations the application 310 and the application 312 are allowed to transfer data between one another, via the logical connection 320. For example, the application 310 may be a mapping application associated with the perimeter 110a, and the application 312 may be an email application associated with the perimeter 110b. The perimeter 110b is corporate perimeter, configured to receive corporate e-mail messages using the application 312, which may include sensitive and confidential information. The perimeter 110a is a personal perimeter; thus is not typically configured in a secure manner, for example, data stored in perimeter 110a may not be encrypted while all data stored in perimeter 110b is encrypted. However, in some instances, a portion of a data file received by the application 312 may be needed by the application 310. In this example, this may be an address to a location that is needed to configure the mapping application 310. As such, cross perimeter data transfer is allowed between the application 312 and the application 310 by the cross-perimeter policy and a data audit trail is generated to audit the transfer of any sensitive and confidential information.

FIG. 5 is a flowchart illustrating an example method 500 for generating a data audit trail for cross-perimeter data transfers initiated from an encrypted perimeter to an unencrypted perimeter implemented by a processor 602 of a computing device 102. In particular, the method 500 includes identifying policies and sub-policies for each perimeter and determining whether to permit a cross-perimeter data transfer operation and to determine if a data audit trail is required. The method 500 is for illustration purposes only and the described or similar techniques may be performed at any appropriate time, including concurrently, individually, or in combination. In addition, many of the steps in the flowchart may take place concurrently and/or in different orders than as shown. Moreover, the computing device 102 may use methods with additional steps, fewer steps, and/or different steps, so long as the methods remain appropriate.

In some embodiments, all data stored in the encrypted perimeter, such as corporate perimeter 110b, is encrypted by the processor 602 of device 102 as defined by the encryption policy to help ensure the security of data associated with the perimeter. For example, perimeter 110b can be a managed perimeter containing corporate data 112b. As indicated at step 502, data is encrypted for storage in the encrypted perimeter 110b. This data may be received using a network resource 114 via the communication interface 604. If the data is encrypted as received, then a secondary encryption scheme defined in the encryption policy of the perimeter may be applied. In other embodiments, any data that is encrypted as received is decrypted and then re-encrypted using an encryption algorithm and encryption key associated with the perimeter 110b, as defined in the encryption policy of the perimeter 110b. At 504, the encrypted data is then stored in memory 620 associated with the encrypted perimeter 110b. This data 112b, for example, a text string, an image, audio data, code or other data, may contain confidential information.

A user, having an associated user ID, such as user 106, is then able to access the data 112b stored in the encrypted perimeter 110b if the user has the required authentication parameters, as defined by the authentication policy for perimeter 110b. An authenticated user is able to access the data 112b and is further able to request the data 112b be transferred from the encrypted perimeter 110b to the unencrypted perimeter 110a. For example, the user can interact with the device 102 using one or more user interface input devices 606, such as a touch-sensitive display, an optical navigation module, voice control, gesture detected by the camera, or other forms of input devices. This data transfer request is received by the processor 602 of the device 102 at step 506. In this example, the data transfer request may be generated by the user by issuing a command to transfer a data file; by copying or cutting and pasting data; accessing a specific network or type of network; or other cross-perimeter data transfer operation. The data transfer operation may in some embodiments be accessible through a menu provided on a user interface of the device 102.

At optional step 508, the processor 602 determines if the data transfer request received at step 506 is permitted, for example, based on one or more cross-perimeter policy associated with either of the two perimeters 110a and 110b. The processor 602 may be limited from processing the cross-perimeter data transfer request based on pre-defined criteria as specified in the cross-perimeter policies of perimeters 110a and 110b. In some embodiments, the pre-defined criteria are updatable by an administrator, such as admin 108. The pre-defined criteria may limit cross-perimeter data transfer requests from an encrypted perimeter 110b to an unencrypted perimeter 110a to help ensure the data 112b stored in the encrypted perimeter is kept safe.

The pre-defined criteria may for example set limitations on the amount or type of data that can be transferred. One such criterion is that no text string is to be transferred from the encrypted perimeter 110b to the unencrypted perimeter 110a unless the text string has fewer characters than a pre-determined number. This number can be set by an administrator, and may for example be 140 characters. The smaller the pre-determined number is set, the more troublesome it is for a user to transfer large amounts of text over, as more operations are needed to transfer the same text to circumvent the cross-perimeter policy. An example of copying of a compliant text string may for example include copying a link from an email that is being viewed using a messaging application in the encrypted perimeter 110b to a browser application in the un-encrypted perimeter 110a.

In another implementation, one criterion is that when an image file is requested to be transferred, the resolution of the image file is checked by the processor 602. When the resolution of the image file is larger than a pre-determined resolution, the image is automatically resized to the pre-determined resolution, and then the data transfer of the lower resolution image is allowed. In some implementations, the pre-determined resolution is kept low to allow transferring small images up to, for example, a resolution of 640×480.

In step 508, if the data transfer is determined to be not allowable by the processor 602, an error message is displayed, for example on the display 612 of device 102, at step 510. In some implementations, all cross-perimeter data transfers are deemed allowable, in which case steps 508 and 510 are omitted.

On the other hand, if in step 508 the data transfer is determined to be allowable, the data is then decrypted (if necessary) by the processor 602 at step 512, and the decrypted data is transferred to the unencrypted perimeter. Any additional processing that is specified in the perimeter transfer policy is also performed at step 512, for example any required down sizing of an image files as mentioned above. The processor 602 then determines at optional step 514 as to whether a data audit trail is required for the data transfer. The cross-perimeter policy may specify that data audit trails are only required for cross-perimeter data transfers meeting pre-defined transfer criteria. Such criteria for example could specify that a data audit trail be generated only for certain types of data and excluded for other data types—for example address data transferred from an email application 312 in an encrypted perimeter 110b to a mapping application 310 in an unencrypted perimeter 110a is identified as such, and is not audited. In other embodiments, the cross-perimeter policy may only require a data audit trail to be generated when a particular type of data is transferred. For example, the address data has a known format, and is therefore detectable as such by the processor 602. In addition to or instead of data type, the criteria could also specify that certain data sizes are exempt from the creation of audit trails. For example, transferred text data of fewer than a set number of characters, and transferred audio or image data of less than set files sizes could be exempt from being logged in a audit trail.

Accordingly, steps 508 and 514 collectively allow an administrator to define a combination of data transfer criteria that specifies what type and amount of data can be transferred between which applications and resources between perimeters 110b and 110a and, for data that is transferred, a combination of data audit criteria that determines if an audit trail is to be generated for the data transfer. The data audit criteria can define, among other things, one or more of data type, data size, the application 116 or resource 114 that is the data source (in the source perimeter) or the destination application 116 or resource 114 (in the data destination perimeter).

If a determination is made in step 514 that no data audit trail is required, then the method 500 will end at step 516. In some embodiments, all data transferred across perimeters is audited, and therefore step 514 is not performed.

When required, a data audit trail is generated by the processor 602 as indicated at step 518. The data audit trail can be generated in a variety of ways. In one implementation, a data audit trail 680 (see FIG. 4) for each data transfer event is maintained as a unique log file for the data transfer event in on-board device memory 620 comprising ASCII characters that include text information about the data transfer. In some examples, the data audit trail 680 is made up of a plurality of records, with each record including data transfer information for a unique data transfer event, and stored in a database file in memory 620. In some implementations the data transfer information stored in the data audit trail 680 for a data transfer event will contain one or more of: an identification code assigned at step 518 to uniquely identify the data transfer event; at least some content of the transferred data (for example at least one of the text strings contained in the transferred data); a file name or other unique identifier associated with the data; a time-stamp of the time the request was received to transfer the data at step 506; and a user ID associated with the user that generated the request at step 506. In some examples, the data audit trail will specify any processing (for example, decryption or de-resolution) done at step 512 to the data during the transfer process.

In some implementations, the data audit trail 680 is stored in memory 620 and periodically sent to a server 130 (which may for example be an administrative server located in Enterprise Network 104a). By way of example, in some implementations, the data audit trail 680 is stored in device memory 620 in step 520, and a flag is stored to indicate that the data audit trail 680 is stored for sending. Once the data audit trail 680 is sent to the server at step 524, the flag is reset and the data audit trail 680 is erased or otherwise marked to indicate new information that is added subsequent to the transmission. The data audit trail 680 in some implementations is not sent to the server 130 until a pre-determined condition for sending is reached. At step 522, processor 602 determines if the condition for sending has been reached. Until the condition for sending is reached, in some implementations, the data audit trail 680 is stored in memory associated with the encrypted perimeter 110b, as it may contain sensitive or confidential information.

At step 522 the processor 602 determines when the data audit trail should be sent to the server 130 via communication interface 604. In various implementations, the criteria applied in step 522 for determining when the data audit trail 680 is sent to server 680 includes one or more pre-determined conditions, at least some of which can be configured by an administrator, such as admin 108. In some implementations, a pre-determined condition for sending is reached when a pre-determined time is reached. This time can be, for example, 3 AM, to ensure the data transfer to the server 130 is not interrupting any potential use of the device 102. In some embodiments, a pre-determined condition could be a time elapsed since last successful transmission. In some embodiments, a pre-determined condition could include when a pre-defined number of cross-perimeter data transfer events has occurred since the last upload of transfer audit trail to the server.

In some implementations, a pre-determined condition for sending the transfer audit trail to server 130 is dependant on a pre-determined network condition. The pre-determined network condition is in some implementations reached when the device is connected to the server via a low cost network, such as a wireless local area network (WLAN). In other implementations, the pre-determined condition is reached when an encrypted communication session is established with the server 130, for example, using VPN 310. This helps to ensure that no sensitive or confidential information is compromised along the way to the server. In some example embodiments, after the data audit trail 680 is sent to the server, at optional step 526, the data audit trail is deleted from memory 620.

In some implementations, the data audit trail 680 is sent immediately after it is generated by the processor 602 at step 518. In such implementations, one or both of steps 520 and 522 are skipped, and the data audit trail 680 is sent immediately to a server 130 via communication interface 604 at step 524.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the described embodiments set forth in the examples, but should be given the broadest interpretation consistent with the description as a whole.

The invention claimed is:

1. A method implemented by a single computing device having a first perimeter and a second perimeter with access restrictions on resources between the first perimeter and the second perimeter, the first perimeter and the second perimeter each defining a logical separation within a memory of the single computing device, the method comprising:
receiving an input requesting a transfer of data from the first perimeter to the second perimeter;
identifying a first cross-perimeter policy associated with the first perimeter and a second cross-perimeter policy associated with the second perimeter, the first and second cross-perimeter policies defining, for each of the first and second perimeters respectively, one or more criteria for at least one of: permitting the transfer of data or requiring generation of an audit trail;
combining the first cross-perimeter policy and the second cross-perimeter policy to determine at least one of: whether the transfer of data is permitted or whether generation of the audit trail is required; and
in accordance with the determination resulting from the combining:
transferring data from the first perimeter to the second perimeter within the memory of the single computing device in response to the request, if it is determined that the transfer of data is permitted; and
generating a data transfer audit trail including transfer event information about the data transfer, if it is determined that generation of the audit trail is required.

2. The method of claim 1, wherein the transfer event information comprises at least one of: an identifier identifying the data transfer; at least some content of the transferred data; a time-stamp of the data transfer; or a user ID associated with the data transfer request.

3. The method of claim 2, wherein the first perimeter is an encrypted perimeter in which the data is encrypted, the method comprising:
decrypting the data prior to transferring data.

4. The method of claim 1, wherein the data comprises any of a text string, image data, or audio data.

5. The method of claim 3, further comprising:
storing the data audit trail in the encrypted perimeter; and
sending the data audit trail over a network to a server.

6. The method of claim 5, wherein the data audit trail is sent to the server when one or more pre-determined criteria are met, the one or more predetermined criteria including one or more of: a pre-determined elapse of time; a pre-determined network connection for sending the data audit trail; or a pre-determined number of data transfers.

7. The method of claim 5, comprising deleting the data audit trail from the encrypted perimeter after sending the data audit trail.

8. The method of claim 1 wherein:
both the first and second cross-perimeter policies define respective first and second criteria for permitting the transfer of data; and
as a result of the combining, it is determined that the transfer of data is Permitted if both the first and second criteria are met.

9. The method of claim 1 wherein:
both the first and second cross-perimeter policies define respective first and second criteria for requiring generation of the audit trail; and
as a result of the combining, it is determined that generation of the audit trail is required if at least one of the first or the second criteria are met.

10. The method of claim 1 comprising processing the data prior to the data transfer, wherein the transfer event information includes information identifying the processing.

11. A computing device configured with a first perimeter and a second perimeter that have respective resources and access restrictions therebetween, the first perimeter and the second perimeter each defining a logical separation within a memory of the single computing device, comprising:
a processor operable to:
receive an input requesting a transfer of data on the computing device from the first perimeter to the second perimeter;
identify a first cross-perimeter policy associated with the first perimeter and a second cross-perimeter policy associated with the second perimeter, the first and second cross-perimeter policies defining, for each of the first and second perimeters respectively, one or more criteria for at least one of: permitting the transfer of data or requiring generation of an audit trail;
combine the first cross-perimeter policy and the second cross-perimeter policy to determine at least one of: whether the transfer of data is permitted or whether generation of the audit trail is required; and
in accordance with the determination resulting from the combining:
transfer data from the first perimeter to the second perimeter within the memory of the single computing device in response to the request, if it is determined that the transfer of data is permitted; and
generate a data transfer audit trail including transfer event information about the data transfer, if it is determined that generation of the audit trail is required.

12. The device of claim 11, wherein the transfer event information comprises at least one of: an identifier identifying the data transfer; at least some content of the transferred data; a time-stamp of the data transfer; or a user ID associated with the data transfer request.

13. The device of claim 12, wherein the first perimeter is an encrypted perimeter in which the data is encrypted, the processor being operable to decrypt the data prior to transferring data.

14. The device of claim 11, wherein the data comprises any of a text string, image data, or audio data.

15. The device of claim 13, the processor being operable to:
store the data audit trail in the encrypted perimeter; and
send the data audit trail over a network to a server.

16. The device of claim 15, wherein the data audit trail is sent to the server when one or more pre-determined criteria are met, the one or more predetermined criteria including one or more of: a pre-determined elapse of time; a pre-determined network connection for sending the data audit trail; or a pre-determined number of data transfers.

17. The device of claim 15, the processor being operable to delete the data audit trail from the encrypted perimeter after sending the data audit trail.

18. The device of claim 11 wherein:
both the first and second cross-perimeter policies define respective first and second criteria for permitting the transfer of data; and
the processor is operable to: determine, as a result of the combining, that the transfer of data is permitted if both the first and second criteria are met.

19. The device of claim 11 wherein:
both the first and second cross-perimeter policies define respective first and second criteria for requiring generation of the audit trail; and
the processor is operable to: determine, as a result of the combining, that generation of the audit trail is required if at least one of the first or the second criteria are met.

20. The device of claim 11 the processor being operable to selectively process the data prior to the data transfer, wherein the transfer event information includes information identifying the processing.

21. A non-transitory computer readable medium having computer-executable instructions tangibly embodied thereon, the instructions, when executed by a single computing device configured with a first perimeter and a second perimeter that have respective resources and access restrictions therebetween, the first perimeter and the second perimeter each defining a logical separation within a memory of the single computing device, causing the single computing device to:
receive an input requesting a transfer of data on the computing device from the first perimeter to the second perimeter;
identify a first cross-perimeter policy associated with the first perimeter and a second cross-perimeter policy associated with the second perimeter, the first and second cross-perimeter policies defining, for each of the first and second perimeters respectively, one or more criteria for at least one of: permitting the transfer of data or requiring generation of an audit trail;
combine the first cross-perimeter policy and the second cross-perimeter policy to determine at least one of: whether the transfer of data is permitted or whether generation of the audit trail is required; and
in accordance with the determination resulting from the combining:
transfer data from the first perimeter to the second perimeter within the memory of the single computer device in response to the request; and
generate a data transfer audit trail including transfer event information about the data transfer.

* * * * *